United States Patent
Minear et al.

(10) Patent No.: US 6,996,394 B2
(45) Date of Patent: Feb. 7, 2006

(54) SERVER PROCESSING IN PROVIDING MESSAGES FOR A WIRELESS DEVICE CONNECTING TO A SERVER

(75) Inventors: Brian Minear, San Diego, CA (US); Mazen Chmaytelli, San Diego, CA (US); Mitchell B. Oliver, San Diego, CA (US); Stephen A. Sprigg, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/232,910

(22) Filed: Aug. 30, 2002

(65) Prior Publication Data

US 2004/0203616 A1 Oct. 14, 2004

(51) Int. Cl.
 *H04M 11/10* (2006.01)
 *H04M 3/00* (2006.01)
(52) U.S. Cl. ............... 455/412.1; 455/413; 455/414.1; 455/419; 455/517; 455/418; 455/466; 455/556.1; 455/566
(58) Field of Classification Search ............... 379/67.1, 379/70, 72, 76, 88.07, 88.11, 88.13, 88.17, 379/88.18, 93.12, 114.13, 142.17, 144.07, 379/144.08, 201.05, 218.01; 455/412, 413, 455/414, 412.1, 418, 419, 517, 414.1, 466, 455/556.1, 566
See application file for complete search history.

(56) References Cited

U.S. PATENT DOCUMENTS

| | | | | |
|---|---|---|---|---|
| 6,018,710 A | * | 1/2000 | Wynblatt et al. | ........... 704/260 |
| 6,366,947 B1 | * | 4/2002 | Kavner | ........................ 709/203 |
| 6,378,069 B1 | * | 4/2002 | Sandler et al. | .............. 713/153 |
| 6,405,309 B1 | * | 6/2002 | Cheng et al. | ................... 713/1 |
| 6,477,150 B1 | * | 11/2002 | Maggenti et al. | ........... 370/312 |
| 6,603,844 B1 | * | 8/2003 | Chavez et al. | ......... 379/114.13 |
| 6,650,901 B1 | * | 11/2003 | Schuster et al. | .............. 379/45 |
| 2003/0143988 A1 | * | 7/2003 | Janadagni | |
| 2003/0143991 A1 | * | 7/2003 | Minear et al. | |
| 2004/0203681 A1 | * | 10/2004 | Ross et al. | |

* cited by examiner

*Primary Examiner*—Allan Hoosain
(74) *Attorney, Agent, or Firm*—Philip R. Wadsworth; Robert J. O'Connell

(57) ABSTRACT

A system and method for providing a message on the graphic display of a wireless device while the wireless device is connecting to an application download server across a wireless network. When the wireless device attempts to communicate with an application download server or changes files while navigating an application download server, a message is transmitted across the wireless network to the computer platform of the wireless device and displayed to the user of the wireless device. The message can be transmitted to the wireless device from the same application download server that the wireless device is attempting to connect to or navigate, or alternately, the message can be transmitted from another server on the wireless network.

37 Claims, 4 Drawing Sheets

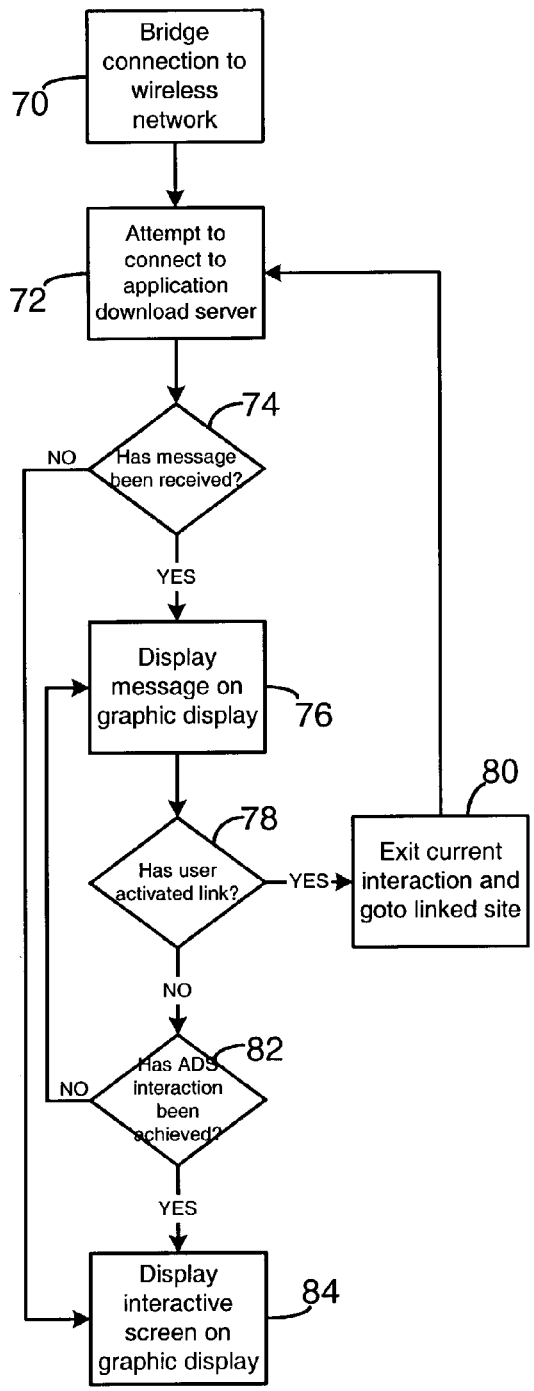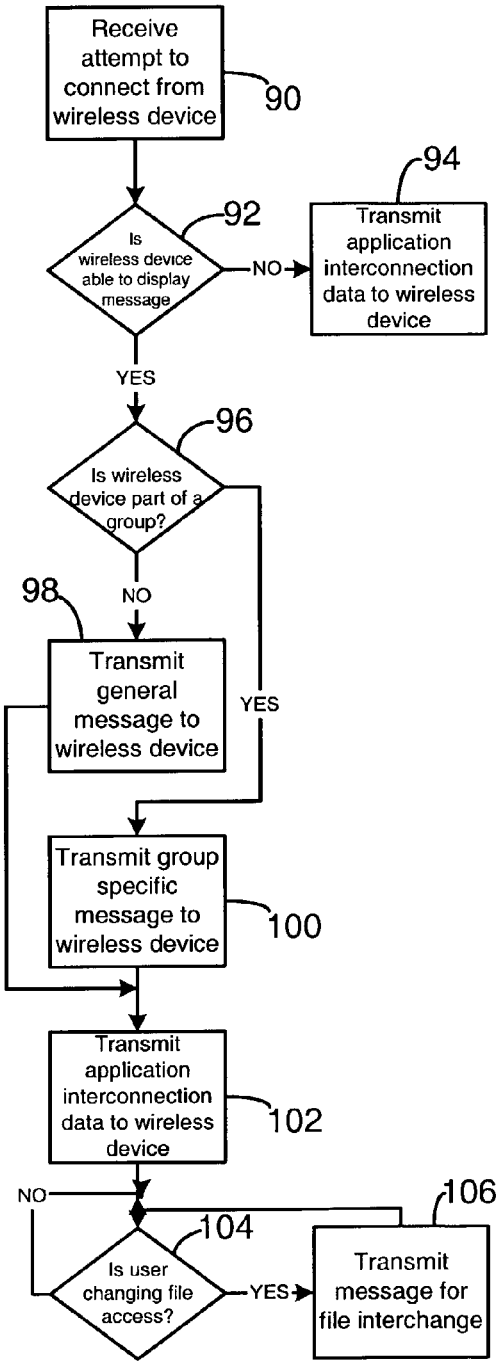
Fig. 4
Fig. 5

SERVER PROCESSING IN PROVIDING MESSAGES FOR A WIRELESS DEVICE CONNECTING TO A SERVER

BACKGROUND OF THE INVENTION

I. Field of the Invention

The present invention generally relates to wireless networks and computer communications across the wireless networks. More particularly, the invention relates to the provision of messages for display on a wireless device while the wireless device attempts to connect with an application download server across a wireless network, or navigates in between application download servers or file structures therewithin.

II. Description of the Related Art

Wireless devices, such as cellular telephones, communicate packets including voice and data over a wireless network. Cellular telephones themselves are being manufactured with increased computing capabilities and are becoming tantamount to personal computers and hand-held personal digital assistants ("PDAs"). Some wireless devices, such as select cellular telephones, may have an installed application programming computer platform that allows software developers to create software applications that operate on the wireless device.

It is anticipated that systems and methods will be developed to transfer data to a wireless device. Accordingly, it is desirable to have systems and methods by which data, such as an advertisement, can be transmitted to a wireless device without substantially impacting the connection time of the wireless device to a server transmitting the message.

SUMMARY OF THE INVENTION

In one embodiment of the present invention, a method for processing a target message for display on a wireless device communicating with an application download server comprises receiving a request from the wireless device at the application download server, initiating the processing of the request from the wireless device, and sending a target message to the wireless device during idle transmission time while processing the request from the wireless device.

In another embodiment of the present invention, a method for processing a target message for display on a wireless device communicating with an application download server comprises receiving a request from the wireless device at the application download server, initiating the processing of the request from the wireless device, sending a signal to a second server indicating that a message may be sent to a wireless device, and sending a message to the wireless device by the second server during idle transmission time between the application download server and the wireless device.

Other objects, advantages, and features of the present invention will become apparent after review of the hereinafter set forth Brief Description of the Drawings, Detailed Description of the Invention, and the Claims.

BRIEF DESCRIPTION OF THE DRAWINGS

FIG. 4 is a flowchart illustrating the process executing on the wireless device computer platform to attempt to connect to an application download server, and receive and display a message to the user in an exemplary embodiment of the present invention.

FIG. 5 is a flowchart illustrating the process executing on an application download server receiving a connection attempt from a wireless device, transmitting an appropriate message to the wireless device, and selectively providing other messages to the wireless device as the user of the wireless device navigates the data structure of the application download server in an exemplary embodiment of the present invention.

DETAILED DESCRIPTION OF THE INVENTION

Introduction

Figure 1:
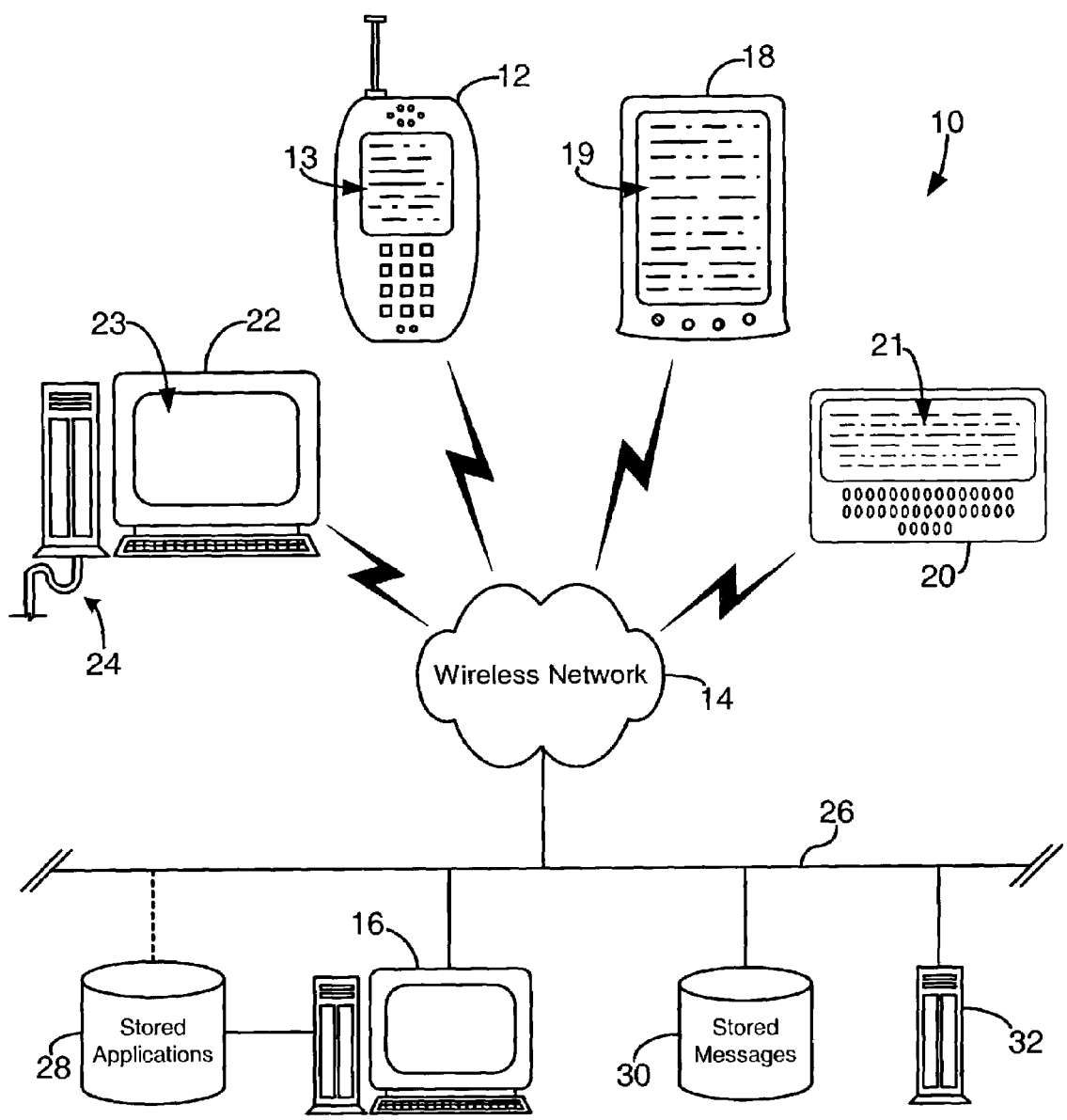
FIG. 1 is a representative diagram of a wireless network and the computer hardware and wireless devices that can be used within the inventive messaging system.

Systems and methods are anticipated that provide for the downloading of software applications to a wireless device. Software applications can come pre-loaded at the time a wireless device is manufactured, or the user may later request that additional programs be downloaded over cellular telecommunication carrier networks, where the programs are executable on the wireless device. As a result, users of wireless devices can customize their wireless devices with programs, such as games, printed media, stock updates, news, or any other type of information or program available for download from application download servers through the wireless network.

In one scenario, if the user of the wireless device desires to download and use a software application using a wireless network, the user will typically either call a service provider or contact the service provider through other means, such as through an Internet access, and the service provider will either transmit the application to the wireless device across the wireless network or allow the user access a network site where the application is downloadable or accessible. To connect to the application download server, the wireless device bridges a communication connection to the wireless network, such as a cellular network, and then attempts to contact an application download server where the desired software application is resident. Once the wireless device contacts the application download server, an initial contact is made and the application download server determines what applications are available to the wireless device and sends the appropriate information, such as a menu, for display on the wireless device so the user can learn of the available applications.

The period between the wireless device's initial contact of the application download server and menu/option display on the wireless device can be significant, lasting several seconds. During the wait period, the graphic display of the wireless device displays either nothing at all until the application download server menu is displayable, or a simple resident message such as "connecting" can be shown to the user.

Accordingly, the present invention provides systems and methods whereby a message, such as an advertisement, can be transmitted and/or displayed to the user of a wireless device while the wireless device is connecting to an application download server. Further, the data comprising the message may be sufficiently compact that the overall connection time is not substantially lengthened.

Systems and methods consistent with the present invention provide a message on the display of a wireless device while the wireless device is connecting to an application download server across a wireless network. When the wireless device attempts to communicate with an application download server across the wireless network, a targeted message, such as an advertisement, is transmitted across the wireless network to the computer platform of the wireless device and displayed to the user of the wireless device. The message can be transmitted to the wireless device from the same application download server that the wireless device computer platform is attempting to connect to or navigate, or the message can be transmitted to the wireless device from another server on the wireless network. The message can include graphics, text, multimedia components, or hyperlinks, all of which are displayable and interactive on the graphic display of the wireless device.

The system particularly includes one or more wireless devices where each wireless device has a computer platform and a graphic display, and the graphic display is operated by the resident driver of the computer platform which can be hardware, firmware, or software. Examples of the wireless device include cellular telephones, text pagers, personal digital assistants (PDAs), or other computer platforms with a wireless link to selectively communicate with a wireless network. The system also includes one or more application download servers that are on the wireless network and each application download server is selectively in communication with the one or more wireless devices and selectively downloading data thereto, such as software applications, graphics, and text.

The wireless devices will attempt to connect with a specific application download server when so instructed by the user, and there is typically a connect wait-period while the application server determines, among other things, what applications can be provided to the wireless device and what the capabilities of the wireless device are. The wireless device typically gains access to a menu or file structure of the application download server wherein the user of the wireless device can navigate within the data structure of the application download server. Other servers can also be present on the network that are not specifically for application download, such as a messaging-only server that transmits messages to wireless devices.

Thus, in the present invention, when a wireless device attempts to communicate with at least one application download server across the wireless network, a message is transmitted to the computer platform of the wireless device across the wireless network for display to the user during the connection wait-period. The message is able to utilize an otherwise idle period of the wireless device to provide advertisements and other information to the user prior to providing full access of the application download server. The message should compact such that its transmission time in a data stream and execution time on the wireless device are minimal so as not to cause a delay in the overall application download server access time.

For more targeted messaging, as is desirable in advertising, each wireless device can be part of a predefined group, based upon age, location, income, or other preferences listed by the owner of the wireless device. When a wireless device that is part of a predefined group attempts to communicate with the application download server across the wireless network, the application download server will identify the group that the wireless device is part of, and a group-specific message is transmitted to the computer platform of the wireless device. As with any message defined herein, the group-specific message can be transmitted to the wireless device from the same application download server that the wireless device attempted to contact or can be transmitted from another server on the network.

Additionally, the message can be comprised of several different components sent from several different servers, and the components are assembled at the wireless device at the time of display. As an example, a graphics component can be sent from the application download server, an audio file can be sent from a first server, and a hyperlink can be provided from another server. The computer platform of the wireless device will then appropriately assemble the components into a message for display.

Messages can also be transmitted for display at the wireless device beyond the initial attempt to contact the application download server. A second message can be sent upon a wireless device attempting to communicate with a second application download server across the wireless network. And if the wireless device interacts with a file structure on the application download server, a message can be transmitted and displayed on the wireless device when the wireless device attempts to change interaction with a file or otherwise navigates within the data structure of the application download server.

Exemplary Embodiments of the Present Invention

With reference to the figures in which like numerals represent like elements throughout, FIG. 1 illustrates a system 10 for providing subscribed software applications to one or more wireless devices, such as cellular telephone 12, in communication across a wireless network 14 with at least one application download server 16 that selectively downloads software applications or other data to the wireless devices across a wireless communication portal or other data access to the wireless network 14. As shown here, the wireless device can be a cellular telephone 12, with a graphics display 13, a personal digital assistant 18 with PDA screen 19, a pager 20 with a graphics display 21, which is shown here as a two-way text pager, or even a separate computer platform 22 that has a wireless communication portal and a display 23, and may otherwise have a wired connection 24 to a network or the Internet. The system 10 can thus be performed on any form of remote computer module including a wireless communication portal, including without limitation, wireless modems, PCMCIA cards, access terminals, personal computers, access terminals, telephones without a display or keypad, or any combination or sub-combination thereof.

The application download server 16 is shown here on a local server-side network 26 with other computer elements in communication with the wireless network 14, such as a stored application database 28 that contains software applications that are downloadable to be executable on the wireless devices 12,18,20,22. There is also shown a stand-alone messaging server 32 and with stored message database 30 that transmits messages to the wireless devices for display thereon as herein described. However, messaging server 32 and message database 30 are not necessary as all server-side functions can be performed on one server, such as application download server 16. Further, any computer server-side computer platform can provide separate services and processes to the wireless devices 12,18,20,22 across the wireless network 14.

Figure 2:
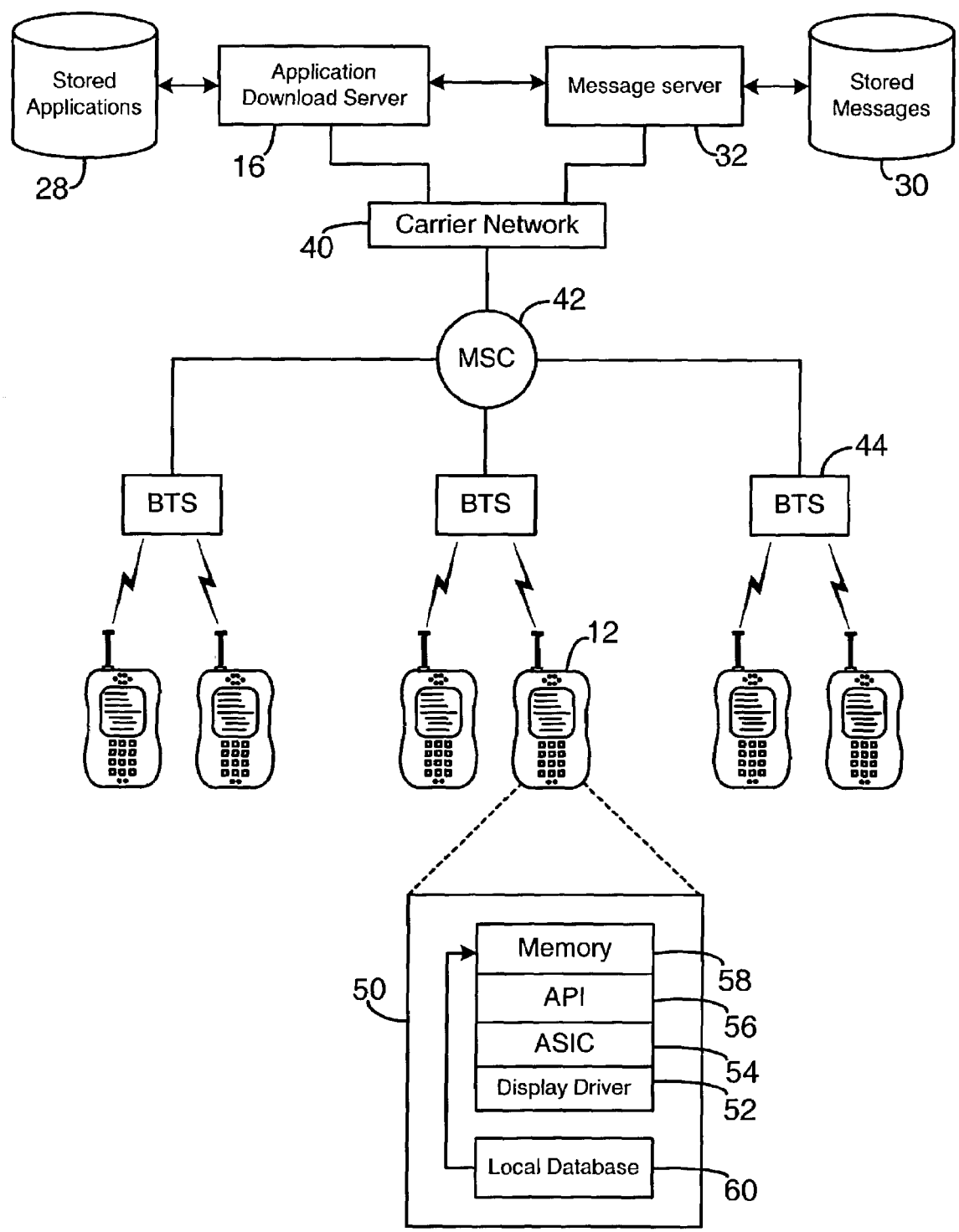
FIG. 2 is a block diagram of the hardware components of the wireless network providing communication between different wireless devices, the application download server, a separate messaging server, and their respective databases.

FIG. 2 is a block diagram that more fully illustrates the components of the wireless network 14 and interrelation of the elements of the system 10. The wireless network 14 is merely exemplary and can include any system whereby remote modules, such as wireless devices 12,18,20,22, communicate over-the-air between and among each other and/or between and among components of a wireless network 14, including, without limitation, wireless network carriers and/or servers. The application download server 16 and the stored application database 28, messaging server 32, and stored messages database 30, may be present on the cellular data network with other components that are needed to provide cellular telecommunication services. The application download server 16 and/or messaging server 32 communicate with a carrier network 40, through a data link, such as the Internet, a secure LAN, WAN, or other network. The carrier network 40 controls messages (generally being data packets) sent to a messaging service controller ("MSC") 42. The carrier network 40 communicates with the MSC 42 by a network, the Internet and/or POTS ("plain ordinary telephone system"). Typically, the network or Internet connection between the carrier network 40 and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

The wireless device, such as cellular telephone 12, has a computer platform 50 that can receive and execute software applications transmitted from the application download server 16. The computer platform 50 includes, among other components, a display driver 52 that drives the graphics display 13 and renders images on the graphics display 13 based upon graphics data received at the computer platform 50. The computer platform 50 also includes an application-specific integrated circuit ("ASIC") 54, or other processor, microprocessor, logic circuit, or other data processing device. The ASIC 52 is typically installed at the time of manufacture of the wireless device. The ASIC 52 or other processor executes the application programming interface ("API") layer 56 that interfaces with any resident programs in the memory 58 of the wireless device. The memory can be comprised of read-only or random-access memory (RAM and ROM), EPROM, EEPROM, flash cards, or any memory common to computer platforms. The computer platform 50 also includes a local database 60 that can hold the software applications not actively used in memory 58, such as the software applications downloaded from the application download server 16. The local database 60 is typically comprised of one or more flash memory cells, but can be any secondary or tertiary storage device as known in the art, such as magnetic media, EPROM, EEPROM, optical media, tape, or soft or hard disk.

The wireless device, such as cellular telephone 12, can download many types of applications, such as games and stock monitors, or simply data such as news and sports-related data. The downloaded data can be immediately displayed on the display 13 or stored in the local database 60 when not in use. The software applications can be treated as a regular software application resident on the wireless device 12,18,20,22, and the user can selectively upload stored resident applications from the local database 60 to memory 58 for execution on the API 56. The user of the wireless device 12,18,20,22 can also selectively delete a software application from the local database 60.

Figure 3:
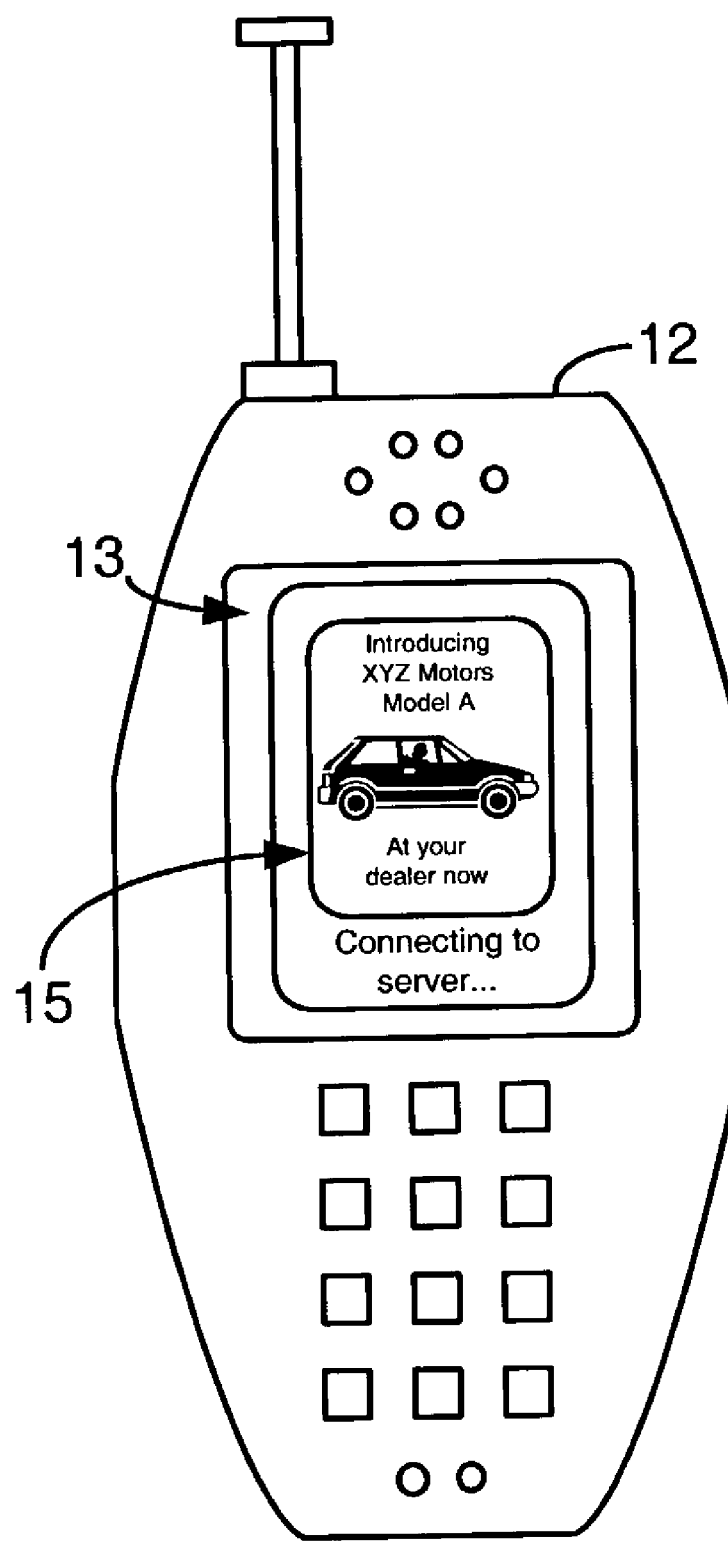
FIG. 3 is a perspective view of the graphic display of a cellular telephone displaying a message while connecting to an application download server in an exemplary embodiment of the present invention.

FIG. 3 illustrates the message 15 displayed upon the graphic display 13 of the cellular telephone 12 when the wireless device 12,18,20,22 attempts to connect to a server, such as application download server 16 in an exemplary embodiment of the present invention. In the connection wait-period that can last several seconds, the system 10 allows a message 15 to be sent for display on the wireless device 12,18,20,22 to the user while the wireless device is otherwise idle awaiting data to navigate the application download server 16. When the wireless device attempts to contact the application download server, a connection screen or communication of connection status may be displayed on the graphic display 13,19,21,23 of the wireless device 12,18, 20,22, and the connection screen may be generated by the wireless device resident operating system or a resident application.

In one embodiment, the system 10, during the connection attempt, transmits a message 15 to the computer platform 50 of the wireless device 12,18,20,22 such that the message can be displayed on the graphic display 13,19,21,23 to the user during the connection wait-period. Here, the message 15 is shown as an automobile advertisement and graphic display 13 also informs the end-user that the connection to the application download server 16 is proceeding. The message can include text, graphics, multimedia, or other network objects such as hyperlinks and applets. While the message can include many types of data, it is preferred that the message be compact and maximally utilize the wireless device resources for display and execution so the message transmission does not interfere with the overall connection to the application download server 16. After the wireless device 12,18,20,22 displays the message 15 during the connection wait-period, the message is preferably supplanted by a display of an options menu or like access screen so that the user has access to the data structure of the application download server 16. Typically, a file menu is displayed on the wireless device 12,18,20,22 such that the user can navigate through various file layers on the application download server 16 and selectively choose to download an available application.

The message 15 can be transmitted to the wireless device 12,18,20,22 from the specific application download server 16 that the wireless device attempted to initially contact. Alternately, the message can transmitted to the wireless device 12,18,20,22 from a messaging server 32 across the wireless network 14, and the messaging server 32. With a messaging server 32, the overhead in transmitting the message can be shifted away from the application download server 16 which has significant resources devoted in the attempt to bridge a connection with the wireless device 12,18,20,22.

Moreover, the use of multiple servers on the wireless network 14 allows the wireless device 12,18,20,22 to receive and display messages comprised of several different components sent from several different servers. The message components can be sent separately and are assembled at the wireless device 12,18,20,22 at the time of display. As an example, a graphics component can be sent from the application download server 16, an executable audio file can be sent from the messaging server 32, and a hyperlink can be provided from another server. The computer platform 50 of the wireless device 12,18,20,22 will then appropriately integrate and assemble the components into a single message for display, execute the message applications, or queue the message components or separate messages for sequential display. The software components can be simple data representing text, graphics, audio files, or full applets separately executable on the computer platform 50 of the wireless device 12,18,20,22.

The system 10 can also transmit messages at times other than the initial connection attempt from the wireless device 12,18,20,22 to the application download server 16, such as when the wireless device attempts to connect to a second server, as occurs when the user of the wireless device activates a hyperlink within a displayed message. Further, the system 10 could also send a message to the wireless device 12,18,20,22 when the wireless device changes file interaction while navigating the data structure of the application download server 16 (typically a file structure such as in Windows, UNIX, and LINUX). Messages can thus be sent to the wireless device 12,18,20,22 either in addition to the first message at the initial connection attempt, or at a predetermined interaction interval such as server access change or a file interaction change.

The messages can be targeted to the wireless device user based upon many criteria, including a specific group that the user (or registered owner of the wireless device) belongs to, the application download server 16 desired to be connected to, or the specific file which the user desires to access. The owner of the wireless device can register with a specific group known to the system 10, examples being teenagers, golf enthusiasts, business owners, and the like. When the wireless device 12,18,20,22 initially attempts to contact the application download server 16, the system 10 can have a specific message targeted to the wireless device as a member of the predefined group. Group membership can be identified automatically in the initial electronic handshake between the wireless device 12,18,20,22 and the application download server 16, or the system 10 can prompt the end-user of the wireless device 12,18,20,22 from the application download server 16 or a separate server such as messaging server 32, to designate a specific group, and then once the end-user inputs group identification data, the data can be received from the prompting server (i.e. at the application download server 16 or messaging server 32, or both). In such embodiment, the end-user of the wireless device actually can determine the group so the targeted messaging is more likely to be received by a member of its intended group demographic. And other messages can be targeted based upon the subject matter or context of the message-triggering event, such as the subject matter on a second application download server desired to be accessed, or nature of the file on the application download server 16 desired to be navigated.

In operation of the system 10 as is shown in the flowchart of FIG. 4, the wireless device, such as cellular telephone 12, first attempts to bridge a connection to the wireless network 14, shown by step 70, and once a communication to the wireless network 14 is made, the wireless device attempts to connect to the application download server 16 to access downloadable software applications or data therefrom, as shown at step 72. A decision is then made as to whether a message has been received from the system 10, as shown at decision 74. If a message has not been received at decision 74, then the wireless device simply waits for the full interactive connection to be made with the application download server 16 and displays the application download server 16 interactive screen on the graphic display 13 of the wireless device (such as cellular telephone 12), as shown at step 84. If a message has been sent at decision 74 then the message is displayed on the graphic display 13 of the wireless device 12, as shown at step 76.

If the message is embodied with a hyperlink, the wireless device 12 can make a decision as to whether the user has activated the hyperlink, as shown at decision 78. If the user has activated the hyperlink, then the current interaction session is exited and the wireless device redirects its connection attempt at the linked site, as shown at step 80, and then the wireless device attempts to contact the linked application download server, and returns to step 72. If the user has not activated a link at decision 78, a decision is then made as to whether the application download server 16 interaction has been achieved by the wireless device, as shown at decision 82. If the interaction has not been achieved, then the message is continued displayed on the graphics display 13 of the wireless device 12, as the process returns to step 76. If the application download server 16 interaction has been achieved at decision 82, an application download server 16 interactive screen is displayed on the graphic display 13 of the wireless device 12, as shown at step 84, or otherwise the state of interactivity with the application download server 16 provided by the specific system 10 is entered.

The flowchart of FIG. 5 illustrates the parallel process on the application download server 16 that occurs in response to the connection attempt from the wireless device 12 as shown in FIG. 4. The application download server 16 initially receives the communication attempt from the wireless device (such as cellular telephone 12), as shown at step 90, and then a decision is made as to whether the wireless device is able to display a message, as shown at decision 92. The decision can be made based upon data exchanged directly with the wireless device, the wireless network 14, or based upon stored data on the capability of the wireless device. If the wireless device 12 cannot display a message at decision 92, then the application download server 16 transmits the data necessary to effect and interconnection between the wireless device 12 and the application download server 16 such that the wireless device 12 can have access to the downloadable applications. If the wireless device is able to display a transmitted message at decision 92, then a decision is made as to whether the wireless device 12 is part of a predefined group or demographic, as shown at decision 96.

If the wireless device 12 is not part of a predefined group at decision 96, then a general message is transmitted to the wireless device, such as a general advertisement, as shown at step 98. The transmission of the general message can occur from the application download server 16 or from a messaging server 32. Otherwise, if the wireless device is a part of a predefined group at decision 96, then a group-specific message is sent to the wireless device 12, at shown at step 100, from either the application download server 16 or a group-specific messaging server 32. After either the general message at step 98 or the group-specific message at step 100 has been sent to the wireless device 12, the application download server 16 transmits the downloadable application interconnection data to the wireless device 12 such that the wireless device 12 can have navigable access to the applications of the application download server 16.

If the system 10 is embodied to send messages to the wireless device 12,18,20,22 upon changing file access in navigating the data structure of the application download server 16, then once the full interaction is achieved, the application download server 16 determines if the user has changed file access, as shown at decision 104. If the user has not changed file access, then the process repeats the decision at 104 while the user is navigating the application download server 16. If the user has changed file access at decision 104, then a message is transmitted to the wireless device 12,18, 20,22 while the file access changes, as shown at step 106, and the application download server 16 again determines if the user has changed file access at decision 104. The message transmitted at step 106 can be sent from the application download server 16 or from a separate messaging server 32 to the wireless device.

The system 10 thus includes a method for providing a message on the graphic display 13,19,21,23 of a wireless device 12,18,20,22, having the steps of attempting to communicate from the wireless device 12,18,20,22 to the application download server 16 across the wireless network 14, such as would occur if the user activates a hyperlink within a message transmitted at the original connection attempt, transmitting a message to the wireless device 12,18,20,22 across the wireless network 14 where the message for display on the graphic display 13,19,21,23 of the wireless device 12,18,20,22, receiving the transmitted message at the computer platform 50 of the wireless device 12,18,20,22, and displaying the transmitted message on the graphic display 13,19,21,23 of the wireless device 12,18,20,22. And if the wireless device 12,18,20,22 is part of a predefined group, the method further includes identifying the group that the wireless device is part of when the wireless device 12,18,20,22 attempts to communicate with the application download server 16 across the wireless network 14, transmitting a group-specific message to the computer platform 50 of the wireless device, receiving the group-specific message at the computer platform 50 of the wireless device 12,18,20,22, and displaying the group-specific message on the graphic display 13,19,21,23 of the wireless device 12,18, 20,22.

The method can also include sending messages to the wireless device 12,18,20,22 instead of the initial connection attempt, or the message can be secondary to the message transmitted at the initial connection attempt. The method can thus includes attempting to connect from the wireless device 12,18,20,22 to a second application download server 16 across the wireless network 14, transmitting a second message to the computer platform 50 of the wireless device 12,18,20,22 across the wireless network 14, receiving the second message at the computer platform 50 of the wireless device 12,18,20,22, and displaying the second transmitted message on the graphic display 13,19,21,23 of the wireless device 12,18,20,22. And if the wireless device 12,18,20,22 can navigate the data structure or file structure of the application download server 16, then the method can include interacting, from the wireless device 12,18,20,22, with a file structure on the application download server 16, attempting to change interaction with a file on the application download server 16, transmitting a second message to the computer platform 50 of the wireless device 12,18,20,22 across the wireless network 14 (either from application download server 16 or messaging server 32), receiving the second message at the computer platform 50 of the wireless device 12,18,20,22, and displaying the second transmitted message on the graphic display 13,19,21,23 of the wireless device 12,18,20,22.

In view of the method being executable on the computer platform of a wireless device 12,18,20,22, the present invention includes a program resident in a computer readable medium, where the program directs a wireless device having a computer platform to perform the method. The computer readable medium can be the memory 58 of the computer platform 50 of the cellular telephone 12, or other wireless device, or can be in a local database, such as local database 60 of the cellular telephone 12. Further, the computer readable medium can be in a secondary storage media that is loadable onto a wireless device computer platform, such as a magnetic disk or tape, optical disk, hard disk, flash memory, or other storage media as is known in the art.

The present invention may be implemented, for example, by operating portion(s) of the wireless network 14 to execute a sequence of machine-readable instructions, such as wireless platform 50, the application download server 16, and messaging server 32. The instructions can reside in various types of signal-bearing or data storage primary, secondary, or tertiary media. The media may comprise, for example, RAM (not shown) accessible by, or residing within, the components of the wireless network 14. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A method for processing a target message for display on a wireless device communicating with a destination application download server, comprising:

receiving a request from the wireless device after connecting with the destination application download server;

initiating the processing of the request from the wireless device; and sending the target message to the wireless device during idle transmission time while processing the request from the wireless device, wherein the target message comprises a message unrelated to a status of the request.

2. The method of claim 1, wherein the target message sent to the wireless device is sent by a second server.

3. The method of claim 1, wherein the target message is comprised of a plurality of components.

4. The method of claim 3, wherein sending a target message to the wireless device comprises:

sending a first one of the plurality of components of the target message by the application server; and sending a second one of the plurality of components of the target message by a second server.

5. The method of claim 1, wherein the target message comprises a hyperlink.

6. The method of claim 1, wherein the target message comprises a multimedia component.

7. The method of claim 1 further comprising:

sending a second request by the wireless device;

initiating the processing of the second request; and sending a second message to the wireless device during transmission idle time.

8. The method of claim 7, wherein the sending of the second request by the wireless device is received by a second server.

9. The method of claim 1 further comprising:
defining a target group of a plurality of wireless devices; and
determining if the wireless device that sent the request is in the target group;
wherein sending the target message to the wireless device during idle transmission time includes sending a group-specific message associated with the target group.

10. The method of claim 1, wherein the application download server is configured to download a software application over a wireless network.

11. The method of claim 1, wherein the target message comprises an advertisement.

12. The method of claim 1, wherein the target message is compact such that the sending of the target message does not substantially lengthen an overall connection time between the wireless device and the application download server.

13. A method for processing a target message for display on a wireless device communicating with a destination application download server, comprising:
receiving a request from the wireless device after connecting with the destination application download server;
initiating the processing of the request from the wireless device;
sending a signal to a second server indicating that the target message may be sent to a wireless device, wherein the target message comprises a message unrelated to a status of the request; and
sending the target message to the wireless device by the second server during idle transmission time between the application download server and the wireless device.

14. The method of claim 13 further comprising:
defining a target group of a plurality of wireless devices;
determining if the wireless device that sent the request is in the target group;
wherein sending the target message to the wireless device during idle transmission includes sending a group-specific message associated with the target group.

15. The method of claim 13, wherein the target message is comprised of a plurality of components.

16. The method of claim 15, wherein sending a target message to the wireless device comprises:
sending first one of the plurality of components of the target message by the second server; and
sending a second one of the plurality of components of the target message by a third server.

17. The method of claim 13, wherein the target message comprises a hyperlink.

18. The method of claim 13, wherein the target message comprises a multimedia component.

19. The method of claim 13, wherein the application download server is configured to download a software application over a wireless network.

20. The method of claim 13, wherein the target message comprises an advertisement.

21. The method of claim 13, wherein the target message is compact such that the sending of the target message does not substantially lengthen an overall connection time between the wireless device and the application download server.

22. A device for processing a target message for display on a wireless device communicating with a destination application download server, comprising:
means for receiving a request from the wireless device after connecting with the destination application download server;
means for initiating the processing of the request from the wireless device; and
means for sending the target message to the wireless device during idle transmission time while processing the request from the wireless device, wherein the target message comprises a message unrelated to a status of the request.

23. A computer readable medium containing computer readable instructions for processing a target message for display on a wireless device communicating with a destination application download server that when executed perform the method, comprising:
receiving a request from the wireless device after connecting with the destination application download server;
initiating the processing of the request from the wireless device; and
sending the target message to the wireless device during idle transmission time while processing the request from the wireless device, wherein the target message comprises a message unrelated to a status of the request.

24. A system for processing a target message for display on a wireless device, comprising:
a destination application download server operable to connect with the wireless device and receive a request from the wireless;
a server operable to initiate processing of the request from the wireless device; and
a server operable to send the target message to the wireless device during idle transmission time while processing the request from the wireless device, wherein the target message comprises a message unrelated to a status of the request.

25. The system of claim 24, wherein the server that is operable to initiate processing of the request is the application download server.

26. The system of claim 24, wherein the target message sent to the wireless device is sent by a server other than the application download server.

27. The system of claim 24, wherein the wireless device is a member of a defined target group of wireless devices and the target message is associated with the target group.

28. The system of claim 24, wherein the application download server is configured to download a software application over a wireless network.

29. The system of claim 24, wherein the target message comprises at least one of a graphic, text, a network object, a multimedia component, and an advertisement.

30. The system of claim 24, wherein the target message is compact such that the sending of the target message does not substantially lengthen an overall connection time between the wireless device and the application download server.

31. A wireless device for displaying a target message, comprising:
a computer platform operable to connect with and send a request to a destination application download server; and
the computer platform operable to receive the target message during an idle transmission time in which the application download server is processing the request from the wireless device, wherein the target message comprises a message unrelated to a status of the request.

32. The wireless device of claim 31, wherein the target message is sent by a server other than the application download server.

33. The wireless device of claim 31, wherein the wireless device is a member of a defined target group of wireless devices and the target message is associated with the target group.

34. The wireless device of claim 31, wherein the target message comprises at least one of a graphic, text, a network object, a multimedia component, and an advertisement.

35. The wireless device of claim 31, wherein the application download server is configured to download a software application over a wireless network.

36. The wireless device of claim 31, wherein the target message is compact such that the receiving of the target message does not substantially lengthen an overall connection time between the wireless device and the application download server.

37. The wireless device of claim 31, wherein the target message is comprised of a plurality of components, and wherein the computer platform is operable to receive at least one of the plurality of components.

* * * * *